July 14, 1964 W. P. BARRETT 3,141,145

FEED-THROUGH SMOOTHING FILTER

Original Filed March 29, 1956

INVENTOR.
WARREN P. BARRETT

BY Raymond A. Paquin
ATTORNEY.

United States Patent Office 3,141,145
Patented July 14, 1964

3,141,145
FEED-THROUGH SMOOTHING FILTER

Warren P. Barrett, Belchertown, Mass., assignor, by mesne assignments, to Three Rivers Industries, Inc., Three Rivers, Mass., a corporation of Massachusetts Division of application Ser. No. 574,888, Mar. 29, 1956. Continuation of application Ser. No. 814,826, May 21, 1959. This application Sept. 20, 1961, Ser. No. 139,485
3 Claims. (Cl. 333—79)

The invention relates to a new and improved electrical device for use as a feed-thru filter in electrical circuits, and has more particular reference to an electrical device for use as a suppression element in which the inherent inductance of a capacitor together with an exteriorly positioned magnetic layer of material spaced from the inherent inductive and capacitive element of the filter provides for the increase of the inductance without capacitance coupling to ground, and as such forms a rolled, integrally constructed and compact unit.

This application is a division of my application Serial No. 574,888 filed March 29, 1956, and is a continuation of my application Serial No. 814,826 filed May 21, 1959, both of which are abandoned.

An object of the invention is to provide a new and improved feed-thru filter of the type set forth which may be adapted for use in radio circuits in which the results are to achieve a broad-band suppression element which considerably surpasses the attenuation characteristics expected from an ideal capacitor. The unit is constructed at the approximate costs of a standard filter capacitor.

The electrical filter of the invention utilizes as the through-current conductor one layer of foil. This adaptation to the electrical filters finds particular utility in the low to medium current applications. The incrementally distributed L-C characteristics attained by this arrangement provides a use also as a Delay Line in circuits useful to military and civilian electronics applications.

It has been known that capacitors in circuits either alone or in combination with inductors, have been one of the fundamental circuit elements for the elimination of undesirable interference signals. Progress in the field of interference suppression has been generally directed to the progressive improvement and development of capacitor elements for the elimination of interference voltages.

An object of the present invention is to achieve the elimination of the inductive elements which are inherent in a standard, conventional filter capacitor. This had been found to eliminate or reduce the impedance in the ground path. The inductance characteristically appears in the lead wiring to the capacitor, in the turns in the length and the width of the capacitor foils, as well as in the length of the ground connection for the capacitor.

The feed-thru type of capacitor, which is extensively used in suppression circuits in communications equipment, is the culmination of a lengthy program of improvement specifically directed to the elimination of unwanted inductances. A properly constructed unit would almost completely overcome the problem of lead inductance, and would bring the ground circuit impedance to a bare minimum. By progressively stripping the old standard condenser of its inherently inductive components, the performance of the feed-thru capacitor may be improved to approach a degree of the ideal, or pure capacitor.

In the high state of development attained by the use of feed-thru type capacitors in recent years, superior performance in filter capacitor units is desirable in several areas of application. One example of desirable improvement is the circuit which cannot stand the addition of unlimited capacitance to attain the required attenuation, in which case it is imperative that the ratio of insertion loss to capacitance loading be substantially increased such that proper suppression may be obtained without disabling the circuit. Another problem is the desire to eliminate the characteristic dip in the attenuation curve of a feed-thru condenser. Choice is required to prevent the coincidence of the capacitor attenuation dip and noise level peak at a common frequency. Of course, there is the ever present requirement for more attenuation per pound, and per cubic inch.

Perhaps the outstanding advantage of the new electrical filter is to use conjointly the turns, the length of one of the foils as the through current carrying conductor, the length of another foil as a grounded inductor, and further to utilize a means to intimately link the flux with the incrementally distributed capacitance throughout the lengths of the turns. This has been found to yield a sizeable amount of inductance in such a constructive arrangement of the turns of a useful magnitude for use in the filter circuit. The inductance so obtained is free from the usual resonant effects, because of the turn-to-turn isolation. The inductance also is substantially independent of frequency, and the result thereof is an extremely broad-band suppression element, which is constructed as a capacitor, but is found considerably exceeding the insertion loss of even an ideal capacitor. Stated in another manner it may be said that the new filter unit gives much higher insertion loss for a given capacitance loading on the circuit, due to intimate distribution of the inductance within the ground plane capacitance.

One of the more important applications of the new filter unit is as an artificial line with distributed constants. The inductance is in its most effective form, being distributed throughout the turns of the capacitance.

One of the major constructional differences between conventional feed-thru capacitors and the unit of the invention is in the live, or hot, foil in which the edge thereof is not extended beyond the dielectric paper for its insulation as in conventional condenser construction. The edges of successive turns are not all joined together but instead, the hot foil is converted into a long, spirally wound tape conductor. By providing circuit connections to the inside and outside ends of the foil, it becomes in effect an inductive thru conductor of a feed-thru capacitor. This modified capacitor section is then hermetically sealed in a can or receptacle in a conventional manner. The entire assembly is then mounted by a terminal stud fastening means to assure thereby good grounding of the can or receptacle and completing the low impedance circuit of the condenser to ground.

With the new arrangement, it is possible to provide a wide foil, in which the foil has fewer turns but provides the same capacity where it has the same surface area as a narrow foil with more turns, so that the wide foil arrangement results in a lower resistance or higher current carrying capacity for a given thickness of the foil. Attenuation, on the other hand, may be considerably enhanced by winding the element with narrow foils. The L-C ratio is thereby increased and the unit becomes more effective. For maximum attenuation, therefore, the winding should be arranged to form a unit that approaches substantially a square in cross section and is found to be distinguished from the conventional feed-thru condenser which is effectively constructed in a long, thin configuration.

Therefore, another object of the present invention is to provide an incremental dispersion of the inductance throughout the capacitance in which it therefore becomes in reality, a distributed constant artificial line.

Another important object of the invention is to provide improved means for radio interference suppression.

The device of the invention is comprised of a pair of foils arranged in an insulation relationship to each other so that they are wound as a capacitor, one of the foils is employed as a thru-load current carrying conductor having inductance by virtue of the turns and length of the foil thereof. The edge of this foil is live but it is not extended beyond the dielectric paper nor are the edges thereof joined continuously as in conventional condenser construction. By providing circuit connections to the inside and outside ends of a hot foil, it becomes in effect a long spirally wound tape inductive conductor. The other foil is provided with ground connections. Means may also be provided to more intimately link the inductive characteristics that are distributed throughout the current carrying conductor.

These as well as further advantages which are inherent in the invention will become apparent from the following description, reference being had to the accompanying drawing wherein.

Figure 1:
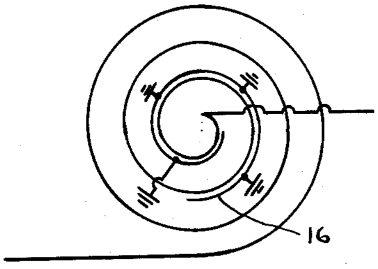
FIG. 1 is a schematic view illustrating how the winding of the foils is commenced in constructing the preferred embodiment of the invention.

Referring more particularly to the drawings wherein similar reference characters designate corresponding parts throughout thereof, the device embodying the preferred form of the invention is shown formed of a plurality of layers of conducting foil material 15, 16 insulated by separate and distinct layers of insulating material 17, 18, 19.

The foil material 15, 16 are layers of metal formed of such conductive material as aluminum, copper, zinc or lead, or these layers could be formed of metalized deposits or coatings on insulating layers such as material 17, 18, 19, alternatively, the layers 15, 16 may be formed of a conducting foil with a coating of insulating material coated or sprayed thereon.

Materials employed in constructing the preferred embodiment of the invention depend largely on the use to be made of the embodied invention, as well as space, environment and cost consideration.

The insulating layers 17, 18, 19 may be made of suitable insulating materials such as impregnated type papers conventionally employed for wound condensers, or these insulating layers may be of films of plastic materials or other dialectic materials, either alone as insulating layers or with magnetic or ferro-magnetic characteristics, or coatings in which case the inductive of the conductive layers would be enhanced by tending to incrementally and intimately link the distributed flux throughout the peripheral portions of the capacitance present in the device.

Figures 3, 5:
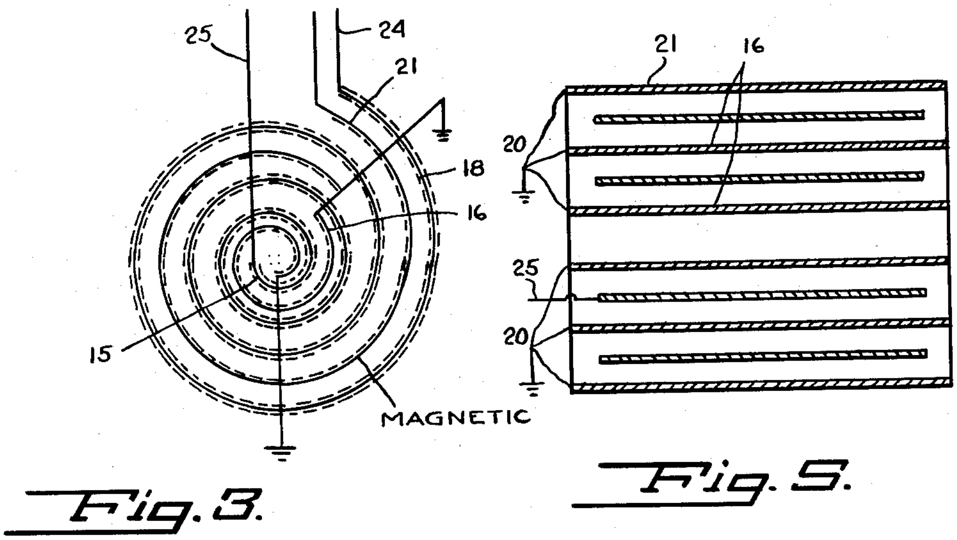
FIG. 3 is a sectional view partly in schematic form to show the insulation thereof, of a preferred form of the invention.
FIG. 5 is a partially diagrammatic view illustrating the form of the invention taken along a cross sectional cut of the form shown in FIG. 3.

The superimposed layers of the conductive and insulating materials are then rolled into coil form of several convolutions as shown in FIG. 3, or otherwise rolled or folded so as to form a relatively simple and compact device.

The rolled or folded convoluted device is then positioned in a casing which is preferably of conducting material, although the casing or housing could be otherwise of non-conducting material by providing suitable connections to the several foils. The projection 20 on layer 16 may be compressed together, forced or bounded into contact with the conductive end of the container to form thereby a ground connection, or this end of a device may be covered with a coating of a conductive material such as solder which would form the desired ground connection by engagement with or soldering to the housing in form of conductive material.

Figure 4:
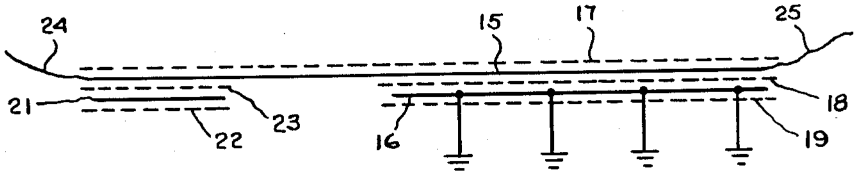
FIG. 4 is a schematic view of the preferred embodiment of invention prior to being formed into the coil shown in FIG. 3.

The grounding of layer 16 to extension or edge fronting is shown in part in each of FIGURES 4 and 5.

The embodiment of the invention shown in FIGS. 3 and 4 include an arrangement providing a separate inductance element such as, in the case of a radio interference suppression filter, wherein such separate inductance element tends to enhance the performance in intimately linking the flux paths throughout the exterior and peripheral portions of the electrical device. The hot ungrounded foil 15 is constructed to extend continuously with an insulating layer and an additional magnetic or ferro-magnetic lamination with a layer of insulated material 22, 23 thereon.

The ferro-magnetic or magnetic layer 21 is also insulated from the ungrounded layer 15. The ferro-magnetic or magnetic layer extends throughout the exterior windings of the device and only beyond the end of the grounded layer 16, thus forming an added inductance without capacitance coupling to ground due to the magnetic flux path formed that layer 21, and in this event such layer may be of the type of material which is also insulation as well as ferro-magnetic, or it may be otherwise of a separate metallic foil 21 which is properly insulated as shown in FIG. 3, and such increases the effective inductance of the resulting device.

The drawings show that the terminals 24, 25 are shown for connection to the hot foil 15 in a circuit to which the filter device is to be connected.

FIG. 5 shows only the conductive layers, and the insulating layers and magnetic layers have been conveniently eliminated in order to accurately illustrate the arrangement of the conductive layers.

Figure 2:
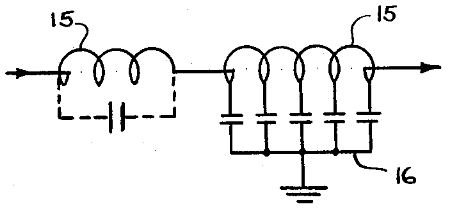
FIG. 2 is an electrical schematic diagram illustrating the electrical properties and equivalent circuit relationships of the electrical filter of the invention.

FIGS. 1 and 2 illustrate the electrical characteristic of the invention as the device is being formed in coil form.

Additional embodiments of the inventions in the specification will occur to others and therefore it is intended that the scope of the invention be limited only by the appended claims and not by the embodiment described herein above. Accordingly, reference should be made to the following claims determining the full scope of the invention.

What is claim is:

1. In a device of the character described including a plurality of layers continuously rolled into a compact unit said device comprising a pair of conducting layers insulated from each other by a sheet of insulation, one of said conduction layers having an edge extending laterally beyond the edge of the insulation and the edge of the other layer on one side only, said extending edge portion of said layer being grounded throughout the length of said edge portion, the opposite edge of said grounded layer lying within the edge of the insulation, the ungrounded layer being connected in a through circuit by leads connected thereto at spaced points, the ungrounded conducting layer forming an inductance in the through circuit in which it is connected and a distributed capacitance with said grounded layer, said spaced connections being shielded from each other, and an ungrounded layer of magnetic material in end to end spaced relation with said grounded layer beyond the end of said grounded layer and insulated from said ungrounded layer to increase said inductance without capacitance coupling to ground, said layer of magnetic material forming a convolution of said rolled mass.

2. A device of the character described comprising two layers of electricity conducting material separated from each other by insulating sheet material and rolled into a compact mass, one of said layers being ungrounded and adapted to be connected in a through circuit, said one of said layers forming an inductance in said through circuit, the second said layer being of two parts, a first said part having an edge portion extending laterally beyond said insulation separating said two layers and grounded along said laterally extending edge portion to form a capacitance with said one of said layers, and an ungrounded second part spaced from said first part and formed of magnetic material, said second part cooperating with said first of said layers to increase the inductance thereof without increasing the capacitance.

3. In a device of the character described, a pair of continuous conducting layers each having substantially fixed width in registry with one another extending in a generally longitudinal direction, a layer of insulation positioned between said conducting layers to insulate the pair of conductors from each other, one of said conducting layers being grounded throughout a portion of its length by an edge of individual electrode element disposed along the length thereof and connected thereto, and insulated from said other layer by said insulating layer for providing the ground connection of said one layer, the opposite edge of said grounded layer lying within the edge of the insulation, said other layer being ungrounded and positioned on the other side of said insulation layer and having terminal means for selectively connecting each of the opposite ends of said ungrounded conducting layer in a through circuit, the ungrounded conducting layer forming an inductance in the through circuit in which it is connected and a distributed capacitance with said grounded layer, said terminal means being shielded from each other, an isolated layer of magnetic material spaced from the end of said grounded layer and on the said side thereof with respect to said ungrounded layer and in superimposed insulated relation with said ungrounded layer so that the sum of the lengths of the isolated magnetic layer and the grounded layer is less than the length of the ungrounded layer to increase the inductance without capacitance coupling to ground, an insulation layer of substantially the length of the ungrounded layer and in registry with one another for sandwiching said pair of conducting layers, and all of said layers being rolled integrally into a convolute, cylindrically shaped compact unit with said isolated layer of magnetic material spaced peripherally from said center and constituting at least one turn.

References Cited in the file of this patent

UNITED STATES PATENTS

| | | |
|---|---|---|
| 2,000,441 | Given | May 7, 1935 |
| 2,027,067 | Schubert | Jan. 7, 1936 |
| 2,260,296 | Christopher | Oct. 28, 1941 |
| 2,440,652 | Beverly | Apr. 27, 1948 |
| 2,521,513 | Gray | Sept. 5, 1950 |
| 2,526,321 | Beverly | Oct. 17, 1950 |
| 2,536,580 | Spurr | Jan. 2, 1951 |
| 2,884,605 | Dubilier | Apr. 28, 1959 |
| 2,892,162 | Bennett | June 23, 1959 |
| 2,918,633 | Schenker et al. | Dec. 22, 1959 |